US010972534B2

(12) United States Patent
Stephens

(10) Patent No.: US 10,972,534 B2
(45) Date of Patent: Apr. 6, 2021

(54) EFFICIENT UN-ALLOCATION OF CLOUD RESOURCES

(71) Applicant: AT&T Intellectual Property I, L.P., Atlanta, GA (US)

(72) Inventor: Robert Todd Stephens, Fayetteville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 21 days.

(21) Appl. No.: 16/426,717

(22) Filed: May 30, 2019

(65) Prior Publication Data

US 2019/0320013 A1    Oct. 17, 2019

Related U.S. Application Data

(63) Continuation of application No. 15/295,712, filed on Oct. 17, 2016, now Pat. No. 10,326,834.

(51) Int. Cl.
*H04L 29/08* (2006.01)

(52) U.S. Cl.
CPC ...... *H04L 67/1023* (2013.01); *H04L 67/1008* (2013.01)

(58) Field of Classification Search
CPC ............. H04N 19/156; H04N 21/2405; H04N 21/23103; H04L 41/0896; H04L 67/1006;
(Continued)

(56) References Cited

U.S. PATENT DOCUMENTS 7,219,249 B1 * 5/2007 Ghose .................. G06F 9/5027
713/324
7,620,720 B1 * 11/2009 Gasser ................ H04L 41/0816
709/221
(Continued)

FOREIGN PATENT DOCUMENTS

CN      103164279 A      6/2013
CN      103220337 A      7/2013
(Continued)

OTHER PUBLICATIONS

Nurmi et al.; "The Eucalyptus Open-source Cloud-computing System"; IEEE Int'l Symposium on Cluster Computing and the Grid; 2009; 8 pages.
(Continued)

*Primary Examiner* — Joe Chacko
(74) *Attorney, Agent, or Firm* — BakerHostetler

(57) ABSTRACT

Cloud services require the outward appearance of unlimited resources with flexible availability for varying demand. However, while on-demand allocation and deallocation of resources may seem efficient, there are significant cases where simply allocating and deallocating resources just in response to demand results in inefficiencies. As discussed herein, cloud services can be made more efficient by deallocating resources based on delays incurred between when resources are requested to be deallocated and reallocated and when they actually are deallocated and allocated, and for how long the resource would be returned to the cloud before needing to be reallocated. Deallocating resources more efficiently not only gives a direct performance improvement, but also indirect, since deallocated resources may not be available again when demand increases.

19 Claims, 9 Drawing Sheets

(58) Field of Classification Search
CPC .... H04L 67/1008; H04W 16/02; H04W 16/00
See application file for complete search history.

(56) References Cited

U.S. PATENT DOCUMENTS

| | | | |
|---|---|---|---|
| 8,307,362 B1 | 11/2012 | Gong et al. | |
| 8,352,608 B1 | 1/2013 | Keagy et al. | |
| 8,433,802 B2 | 4/2013 | Head et al. | |
| 8,688,839 B2 | 4/2014 | Subramanian et al. | |
| 8,738,466 B1 | 5/2014 | Kirby | |
| 8,825,862 B2 | 9/2014 | Anderson et al. | |
| 8,825,864 B2 | 9/2014 | Li et al. | |
| 8,832,239 B2 | 9/2014 | Assuncao et al. | |
| 8,849,971 B2 | 9/2014 | Ferris | |
| 8,880,671 B2 | 11/2014 | Bhogal et al. | |
| 8,910,174 B2* | 12/2014 | Nakajima | G06F 3/0689 718/104 |
| 8,959,367 B2 | 2/2015 | Brown et al. | |
| 8,972,990 B2 | 3/2015 | Ashok et al. | |
| 9,274,917 B2 | 3/2016 | Milojicic et al. | |
| 9,325,585 B1 | 4/2016 | Wang et al. | |
| 10,069,693 B1 | 9/2018 | Daptardar et al. | |
| 2003/0177176 A1 | 9/2003 | Hirschfeld et al. | |
| 2012/0331113 A1* | 12/2012 | Jain | H04L 41/5025 709/220 |
| 2013/0124704 A1* | 5/2013 | Bhogal | G06F 9/5072 709/223 |
| 2014/0095691 A1 | 4/2014 | Ganguli et al. | |
| 2014/0207944 A1 | 7/2014 | Emaru | |
| 2014/0289412 A1 | 9/2014 | Doddavula et al. | |
| 2014/0365662 A1 | 12/2014 | Dave et al. | |
| 2015/0286492 A1 | 10/2015 | Breitgand et al. | |
| 2015/0341445 A1 | 11/2015 | Nikolov et al. | |
| 2016/0034835 A1 | 2/2016 | Levi et al. | |

FOREIGN PATENT DOCUMENTS

| | | |
|---|---|---|
| CN | 103685563 A | 3/2014 |
| CN | 104252393 A | 12/2014 |
| WO | WO 2016/068811 A1 | 5/2016 |

OTHER PUBLICATIONS

Warneke et al.; "Exploiting Dynamic Resource Allocation for Efficient Parallel Data Processing in The Cloud"; IEEE Transactions on Parallel and Distributed Systems; vol. 22.6; Jan. 2011; p. 985-997.

Roy et al.; "Efficient Autoscaling in the Cloud Using Predictive Models for Workload Forecasting"; IEEE Int'l Conf. on Cloud Computing; 2011; 8 pages.

Younge et al.; "Efficient Resource Management for Cloud Computing Environments"; IEEE Int'l Conference on Green Computing; 2010; 8 pages.

Ashraf et al.; "Cost-Efficient Resource Allocation for Multi-Tier Web Applications in a Cloud Environment"; PhD Symposium held in connection w/ the 38$^{th}$ Euromicro Conf. on Software Engineering and Advanced Applications (SEAA); 3 pages.

Buyya et al.; "Energy-Efficient Management of Data Center Resources for Cloud Computing: A Vision, Architectural Elements, and Open Challenges"; Intl'Conf. on Parallel and Distributed Processing Techniques and Applications; 2010; 12 pages.

Ionescu; "Resource Management in Mobile Cloud Computing"; Informatica Economica; vol. 19 No. 1; 2015; p. 55-66.

Suri et al.; "From Concept to Algorithmic Implementation: Optimized Sharing of Resources in Cloud Computing Environment"; Int'l Journal of Computing Applications; vol. 98 No. 9; Jul. 2014; p. 6-16.

* cited by examiner

EFFICIENT UN-ALLOCATION OF CLOUD RESOURCES

CROSS REFERENCE TO RELATED APPLICATIONS

This application is a continuation of, and claims priority to, U.S. patent application Ser. No. 15/295,712, filed Oct. 17, 2016, entitled "Efficient Un-Allocation of Cloud Resources," the entire contents of which are hereby incorporated herein by reference.

BACKGROUND

Cloud computing offers an alternative to owning and maintaining infrastructure for computing. The demands on modern computing increasingly require ways to increase capacity or add capabilities on the fly without investing in new infrastructure, training new personnel, or licensing new software. Services models, such as Infrastructure as a Service (IaaS), Platform as a Service (PaaS), and Software as a Service (SaaS) have arisen in response to this demand.

IaaS involves providing databases, servers, electrical power, and network equipment for a cloud-hosted application. This allows usage fees to replace long-term commitments to infrastructure. PaaS provides a development platform which allows for applications to extend and interact with other cloud applications and cloud data. Lastly, SaaS allows for software to be hosted and run in the cloud rather than on a user's computer. IaaS, PaaS, and SaaS provide scalability—the ability to start with a relatively small or large resource footprint and increase it as needs increase or decrease it as needs decrease.

Cloud service providers are challenged with providing sufficient resources to meet the demands of customers. The goal is elasticity: the ability of a cloud service provider to provision flexible computing power when and wherever required. Cloud service providers must provide the appearance of infinite computing resources available on demand, quickly enough to follow load surges, thereby eliminating the need for cloud computing users to plan far ahead for provisioning. This elimination of an up-front commitment by cloud users allows companies to start small and increase hardware resources only when there is an increase in their needs.

Cloud providers must provide the outward appearance of having available an unlimited amount of resources available on-demand. The benefits of cloud services allow users to avoid not just investing in long-term commitments to infrastructure, but also to avoid having to develop plans on how resources will be used. If there are surges in load, the user expects the cloud to simply provide the needed resources in response. Dedicated computer hardware and software infrastructure has limited flexibility and is unfavorable for reaching this goal. Accordingly, a cloud provider must be able to provide resources to users without the users needing to develop plan for the availability of resources. This places the burden on cloud providers to manage their resources effectively.

SUMMARY

The disclosed systems, methods, and apparatuses allow for efficient un-allocation of cloud resources.

In an aspect, a system may have a processor and memory with instructions that cause the processor to, during a first application runtime, determine a deallocation period based on the time between a request to deallocate a resource and the deallocation of the resource. The instructions also cause the processor to determine a reallocation period based on a time between a request to allocate the resource and the time the resource is allocated. The instructions also cause the processor to determine a giveback period based on a time between the deallocation of the resource and the allocation of the resource. During a second runtime of the application, the instructions cause the processor to determine whether to deallocate the resource based on the deallocation period, reallocation period, and giveback period.

In an aspect, a method may include a deallocation controller determining a deallocation period based on the time between a request to deallocate a resource and when the resource is deallocated during a first application runtime of an application. The method may also include the deallocation controller determining a reallocation period based on the time between the allocation request and the time the resource is allocated. The method may also include the deallocation controller determining a giveback period based on the time between the deallocation of the resource and the allocation of the resource. The method may also include the deallocation controller determining, during a second runtime of the application, whether to deallocate the resource from the application based on the deallocation period, reallocation period, and giveback period.

In an aspect, a computer-readable storage medium may include executable instructions that cause a processor executing the instructions to determine a deallocation period based on a time between a request to deallocate a resource and when the resource is deallocated. The instructions also cause the processor to determine a reallocation period based on a time between a request to allocate the resource and the allocation of the resource. The instructions also cause the processor to determine a giveback period based on a time between the deallocation of the resource and the allocation of the resource. During a second runtime of the application, the instructions cause the processor to determine whether to deallocate the resource from the application based on the deallocation period, reallocation period, and giveback period.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Aspects of the herein described systems and methods for efficient un-allocation of cloud resources are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

DETAILED DESCRIPTION

Figure 1A:
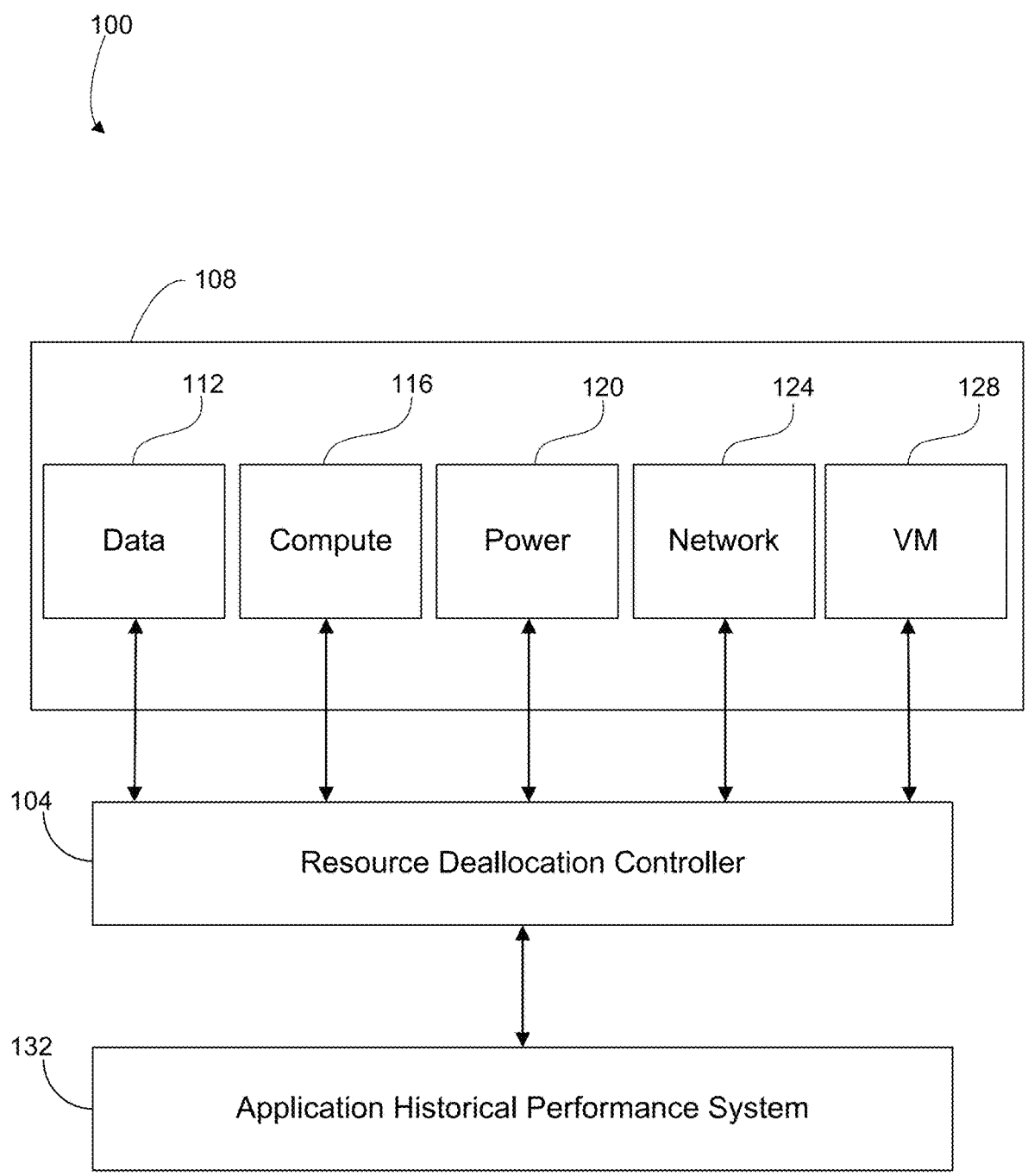
FIG. 1a is a schematic of an illustrative system for efficient un-allocation of cloud resources.

FIG. 1a is a depiction of exemplary cloud resource system 100 in which one or more disclosed examples may be implemented for efficient un-allocation of cloud resources. The terms "un-allocation" and "deallocation" are used interchangeably herein. System 100 includes resource deallocation controller 104 and virtual resource controller 108. Resource deallocation controller 104 is in communication with virtual resource controller 108. Virtual resource controller 108 may include, for example, data virtual resource component 112, compute virtual resource component 116, power virtual resource component 120, network virtual resource component 124, and virtual machine (VM) resource component 128. Specific components of virtual resource controller 108 add functionality to the controller that allows it to control the applicable resource or resources. For example, VM resource component 128 gives virtual resource controller 108 functionality for controlling VMs. Virtual resource controller 108 is not limited to the five specific virtual resource components shown, and may include more or less components, and there may be one or more components for the types of resources shown. For example, virtual resource controller 108 may have only one virtual resource component and therefore only control one cloud resource. There may also be multiple virtual resource controllers 108. Components of virtual resource controller 108 may overlap in the resources controlled and may provide functionality for control of resources at different levels of abstraction. For example, compute virtual resource component 116 may provide functionality for control of allocation/deallocation of resources for one or more compute nodes. A compute node provides the ephemeral storage, networking, memory, and processing resources that can be used by VM instances. A VM is a software program or operating system that not only exhibits the behavior of a separate computer, but is also capable of performing tasks such as running applications and programs like a separate computer. A VM, also referred to as a "guest," is created within another computing environment known as a "host." Multiple VMs can exist within a single host at one time. When a VM instance is created, it is matched to a compute node with the available resources. A compute node can host multiple VMs, and additional VMs may be hosted until all of the compute node's resources are consumed. While compute virtual resource component 116 may provide functionality for control compute node resource allocation/deallocation, VM resource component 128 may, in turn, provide functionality for control of resource allocation of VM instances. Network virtual resource component 124 may provide functionality for allocating/deallocating network resources, such as virtual switches and virtual routers.

Virtual resource controllers 108 may allocate/deallocate resources for one or more applications. Virtual resource controllers 108 may be scalable. Virtual resource controllers 108 may be dormant and may be activated, for example, in response to resource demand. In an aspect, virtual resource controllers 108 may be instantiated for one or more applications. For example, in response to the start of an application runtime, one or more virtual resource controllers 108 may be instantiated based on known or predicted, or known and predicted, demands of the application. There may also be one or more default virtual resource controllers 108 for an application or all applications.

Virtual resource controllers 108 direct the allocation and deallocation of resources. While an application runs, its demands may vary. During a single runtime, for example, an application may require different levels of different resources. Demand may be measured discretely or fluidly. For example, an application may be allocated a certain level of processing resources (by, for example, compute virtual resource controller 108). Once demand exceeds that level of resources, additional processing resources may be allocated to the application. If the new level of resources is exceeded, additional resources may again be allocated, at a same or different rate or amount than before. For example, if x number of resources are allocated to an application, x+1 (or some other increment, such as x+2, x+3, x+y, and so on) may be allocated if demand exceeds x. For example, if three VMs are allocated to an application, and demand exceeds three VMs, then an additional VM may be allocated to the application. As another example, if demand for a resource is initially at a level, and then exceeds that level, the new level may be a percentage of the level above it. This may be reflected in different ways, depending on the resource. For example, if the resource is a Linux container, then demand exceeding the current resource level (current number of Linux containers) may result in an additional Linux container being allocated, or an additional number or percentage of Linux containers. For example, if 100 Linux containers are currently allocated to an application, an additional 10 may be allocated once demand exceeds 100. It could also be that once demand exceeds 100 containers an additional percentage of the current resources allocated is allocated. For example, once demand exceeded 100 containers, an additional 20% could be allocated, which would result in an additional allocation of 20 containers.

System 100 includes application historical performance system 132. Application historical performance system 132 tracks resources used by an application. It may track one resource, a subset of all the resources used, or all the resources used. Application historical performance system 132 determines the allocation/deallocation points. Application historical performance system 132 is in communication with resource deallocation controller 104. When allocations or deallocations are made by virtual resource controllers 108, the information regarding those actions is provided to application historical performance system 132 by resource deallocation controller 104. Application historical performance system 132 may provide information to resource deallocation controller 104 regarding the allocation and deallocation of resources associated with one or more applications. Application historical performance system 132 may be dedicated to a single application or multiple applications. Application historical performance system 132 may be associated with one or more applications while they are running.

One or more parts of system 100 may be embodied provider-side (such as on one or more provider servers) and one or more parts of system 100 may be embodied client-side (such as on one or more client servers or client devices). For example, one or more parts of system 100 may be embodied on an authentication, authorization, and accounting (AAA) server. A AAA server typically interacts with network access and gateway servers and with databases and directories containing user information and application information. User information may be tied to application information. A AAA server may control access to cloud resources, including authenticating users and enforcing security policies. For example, users may need to be authenticated in order to run certain applications or to run applications at different levels of control.

As another example, in an aspect, resource deallocation controller 104 may be embodied on a provider server, while application historical performance system 132 is embodied on a client server. Application historical application performance system 132 may be distributed. For example, application historical performance system 132 may include local application historical performance systems 132 on client devices and provider application historical performance system 132. Provider application historical performance system 132 may communicate with local historical application performance systems 132.

Figure 1B:
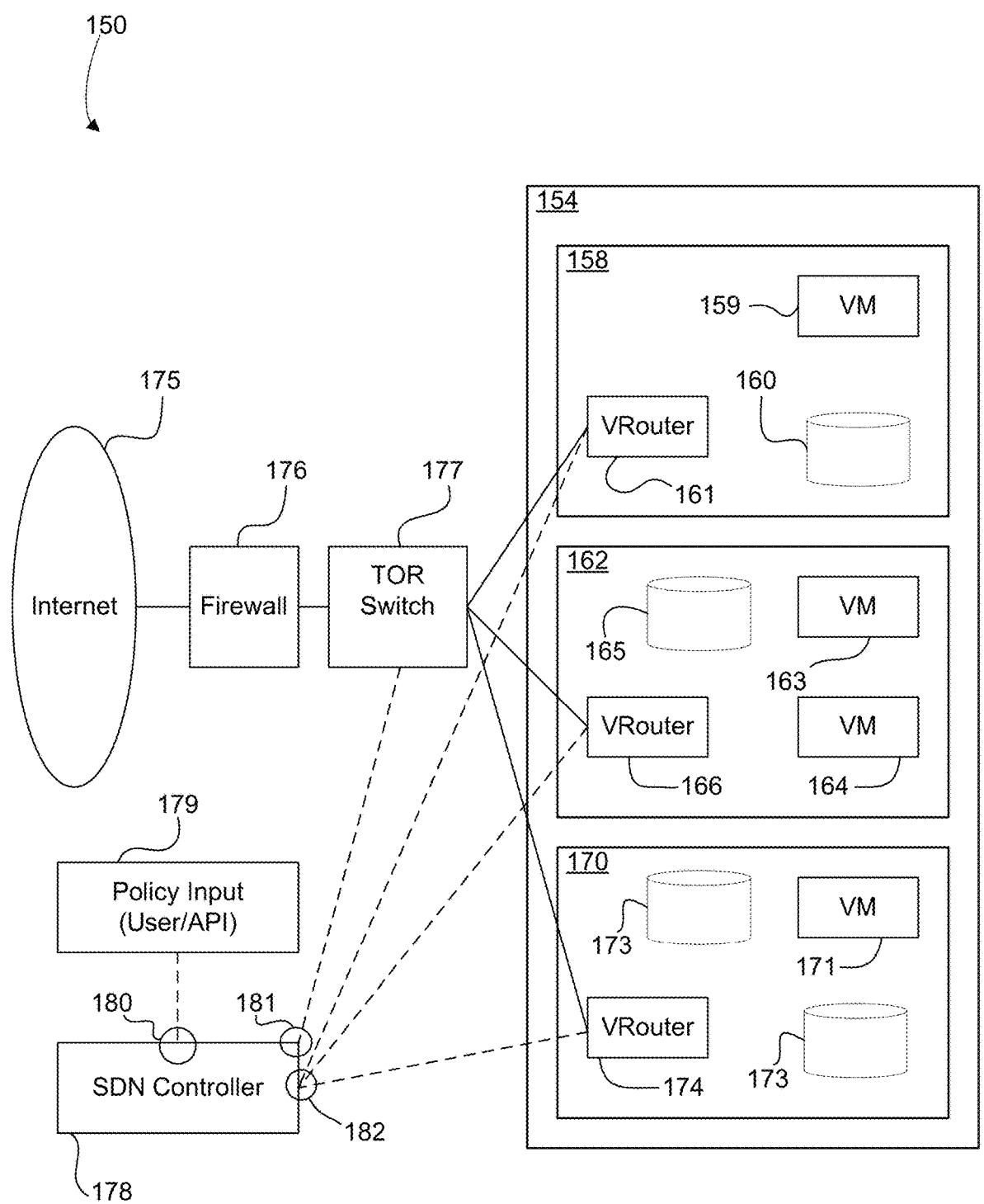
FIG. 1b is a schematic of an embodiment of a high-level architecture of a system for efficient un-allocation of cloud resources.

FIG. 1b is a schematic of high-level system architecture for an embodiment of a system 150 for efficient un-allocation of cloud resources. The system includes a plurality of cloud resources 154 which may include compute node 158, compute node 162, and compute node 170. Associated with compute node 158 may be virtual machine (VM) 159, virtual router (VRouter) 161, and data store 160. A VRouter is a software-based routing framework that allows the host machine to mimic a typical hardware router. A VRouter can enable a computer/server to have the abilities of a full-fledged router by performing the network and packet routing functionality of the router via a software application. Associated with compute node 162 may be VMs 163 and 164, data store 165, VRouter 166. Associated with compute node 170 may be VM 171, data stores 172 and 173, and VRouter 174. Although only three compute nodes are illustrated in this example, it will be understood that any number of compute nodes are contemplated, each having any number of virtual machines and data stores. Compute nodes 158, 162, and 170 may be in communication with switch 177. Switch 177 may be a top-of-rack (ToR) switch. Switch 177 may also be a virtual switch, which is a software-based switching framework that allows the host machine to mimic a typical hardware switch. A virtual switch can enable a computer/server to have the abilities of a full-fledged switch by performing the network and packet-switching functionality of the switch via a software application. Switch 177 may be in communication with firewall 176 which may, in turn, be coupled to a network such as the Internet 175. System 150 also includes software-defined network (SDN) controller 178. SDN controller 178 may be an application that manages flow control to enable intelligent networking. SDN controller 178 may be based on protocols, such as OpenFlow, that allow the controller to tell network devices, such as switches, where to send packets. SDN controller 178 is in communication with compute nodes 158, 162, and 170. Associated with SDN controller 178 are southbound interfaces 181 and 182 and northbound interface 180. Northbound interface 180 interfaces SDN controller 178 to a higher functional layer, and may be used for communications between SDN controller 178 and applications that are higher-layer control programs. Southbound interface serve as the interface which allows SDN controller 178 to communicate with SDN-enabled routers or switches. Its main function is to enable communications with SDN controller 178 and network nodes (both physical and virtual switches and routers) so that the router or switch can discover the network topology, define network flows, and implement requests related to it via northbound APIs.

Figure 2:
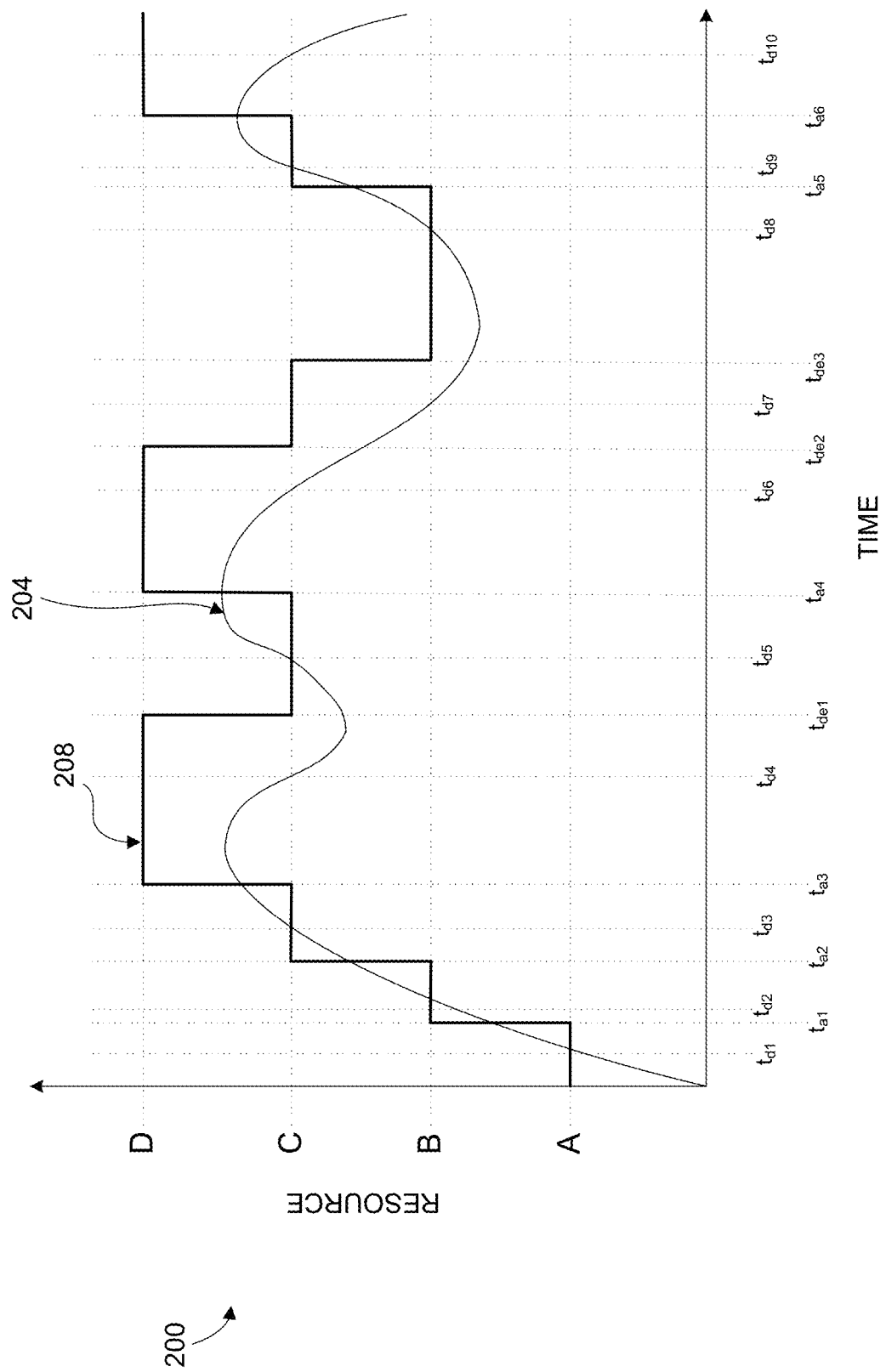
FIG. 2 is a chart example illustrating aspects of the present disclosure.

FIG. 2 is a depiction of an exemplary chart illustrating aspects of the present disclosure. As an application runs, the amount of resources demanded may change. For example, more processing power may be needed and more space may be necessary for storage. For example, for a database application, the number of queries being run may increase, resulting in an increase demand for processing power. Chart 200 depicts an exemplary illustration of resource demand 204 over time. As demand 204 passes thresholds, those resources need to be allocated (or deallocated, for decreasing demand). Resource levels 'A,' 'B,' 'C,' and 'D' are shown, but the number of resource levels is not limited to four discrete levels, and may involve more or less levels. Allocated resources 208, as shown as the bolder line in the chart, depicts the allocated resources over time, showing allocation/deallocation.

For example, as demand passes level 'A,' 'B' level of resources needs to be allocated. A resource may be, for example, virtual machines. In this example, each threshold may represent some incremental number of virtual machines. For example, 'A' may be '1,' B may be '2,' C may be '3,' and so forth. Prior to time td1 (time_demand1), resource demand may be met by an A-level of resources. After resource demand has passed threshold A, a resource request may be generated. For example, a virtual resource controller 108 monitoring an application's use of a resource may generate a request for the allocation (or deallocation) of a corresponding resource in response to changing demand. Continuing the virtual machine example, an additional virtual machine may be allocated to the application. But, the resource is not immediately available. There is a delay between the time the request is made (td1) and the time the resource is allocated. The time the resource is allocated is depicted as time ta1 (time_allocation1). Accordingly, there is a delay between the time the resource is requested to be allocated and when it is actually allocated, defined in this example as ta1-td1.

In this example, demand continues to increase, passing the B level of resources at td2 (time_demand2). The next level of resources is requested at td2, and is allocated at ta2 (time_allocation2). Again, as depicted in FIG. 2, demand increases at td3 (time_demand3) and exceeds the C level of resources currently allocated, resulting in a request for additional resources to be allocated to bring the allocated resources up to the D level. At time ta3 (time_allocation3), the allocation is made.

There is also a delay between the time a deallocation request is made and when deallocation of a resource actually occurs. As depicted in FIG. 2, at td4 (time_demand4), demand decreases below the C level and a deallocation request is generated. At tde1 (time_deallocation1), the resource is actually deallocated. The delay between when the deallocation was made and the time the resource was actually deallocated, defined in this example as tde1-td4, may or may not be equal to the delay between the request for that resource to be allocated and when it was actually allocated, in this example defined as ta3-td3. In other words, the deallocation delay may be greater than, less than, or equal to the allocation delay of a resource.

At td5 (time_demand5), demand increase above the C level, and a request for additional resources to be allocated to bring the allocated resources up to the D level is made (or a request for a D level resource). This reflects that an application's demand for a resource may reach a certain level, decrease below that level, and then subsequently return to that level. At ta4 (time_allocation4), the allocation is made.

At td6 (time_demand6), demand decreases below the C level, and a deallocation request is made. At tde2 (time_deallocation2), the resource is actually deallocated. At td7 (time_demand7), demand decreases below the B level, and a deallocation request is made. At tde3 (time_deallocation3), the resource is actually deallocated. At td8 (time_demand8), demand increases above the B level, and an allocation request is made. At ta5 (time_allocation5), the allocation is made. At td9 (time_demand9), demand increases above the C level, and an allocation request is made. At ta6 (time_allocation6), the allocation is made. At td10 (time_demand_10), demand falls below the C level.

Simply allocating and deallocating on an on-demand basis still results in inefficiencies. First, the costs incurred by deallocating and reallocating resources are not taken into account. Allocating a resource includes requesting, obtaining, configuring, and placing the resource into action. Deallocating a resource includes returning the resource to the cloud environment. Returning a resource to the cloud inventory allows the resource to be obtained for use by other applications. For example, the time needed to "spin up" or prepare another VM, and the time needed to "wind down" or return the VM to the cloud. Allocating and deallocating resources takes time, and during that time the resource is not in use. The time needed to allocate a resource, deallocate a resource, or the sum of the two may equal or exceed savings of allocating and deallocating the resource based simply on demand.

For example, a resource may be a virtual machine (VM). For purposes of this example, it may require 300 seconds to allocate a VM and 300 seconds to deallocate a VM. If the application no longer needs the resource, it will take 300 seconds to deallocate it. The application may need a VM again in, for example, 800 seconds, or 100 seconds after it finished deallocating the resource. Another 300 seconds will be needed to reallocate the resource. Accordingly, the giveback period—the period from when the resource (or resource of the same type) was deallocated and reallocated—for the resource was only 100 seconds, and 600 seconds was used deallocating and allocating the resource, resulting in a loss of 500 seconds.

Additionally, there is no guarantee that resources deallocated will be available when they are needed again. Continuing the example above, during the giveback period, a VM may be requested by another application. No further VMs may be available for the application when the resource is requested again. This may cause further delays until, for example, another VM becomes available in the cloud inventory. This may cause performance issues for the application.

Accordingly, efficiency can be gained by making deallocation decisions based on historical allocation/deallocation data, including the giveback period. For example, deallocation of a resource may only be permitted where the predicted giveback period would be greater than the sum of the time needed to deallocate the resource (which may also be referred to as the "teardown" time) and the time needed to reallocate the resource (which may also be referred to as the "setup" time). As another example, deallocation of a resource may only be permitted where the predicted giveback period would meet a threshold margin above the sum of the teardown and setup times. The threshold margin may be, for example, 150% of the sum of the teardown and setup times, a multiple of the sum (2×, 3×, and so on), or a set amount of time (expressed, for example, in seconds or fractions of a second).

For example, tde1-td4 reflects a teardown delay and ta4-td5 reflects a setup delay, while ta4-tde1 reflects the giveback period. Giveback period may be defined by deallocation of a certain level of resource and reallocation of that level of that resource. For example, ta6-tde2 reflects a giveback period for a level D resource while td9-tde3 reflects a giveback period for a level C resource. The setup and teardown delays may also be determined on a resource level-specific level. Continuing the example, tde2-td6 reflects a teardown delay of a level D resource, and, subsequently, tde3-td7 reflects a teardown delay of a level C resource. Subsequent to both deallocations, level C and D resources are reallocated, with setup delays of ta5-td8 and ta6-td9, respectively.

System 100 can determine each of these values. Determinations may be made during or after application runtimes. Times for allocation/deallocation requests and when corresponding allocations/deallocations were made may be provided to application historical performance system 132 by resource deallocation controller 104 or virtual resource controllers 108. Application historical performance system 132 may calculate teardown delay, setup delay, and giveback periods. To provide estimates/predictions on whether the giveback period would exceed the sum of the teardown and setup delays (and including any additional margin defined on top of that) system 100 can track these periods over multiple runtimes of an application. In an aspect, predictions may require a confidence level, so an estimate may only be used after enough calculations after enough application runtimes to meet that confidence level.

Figure 3:
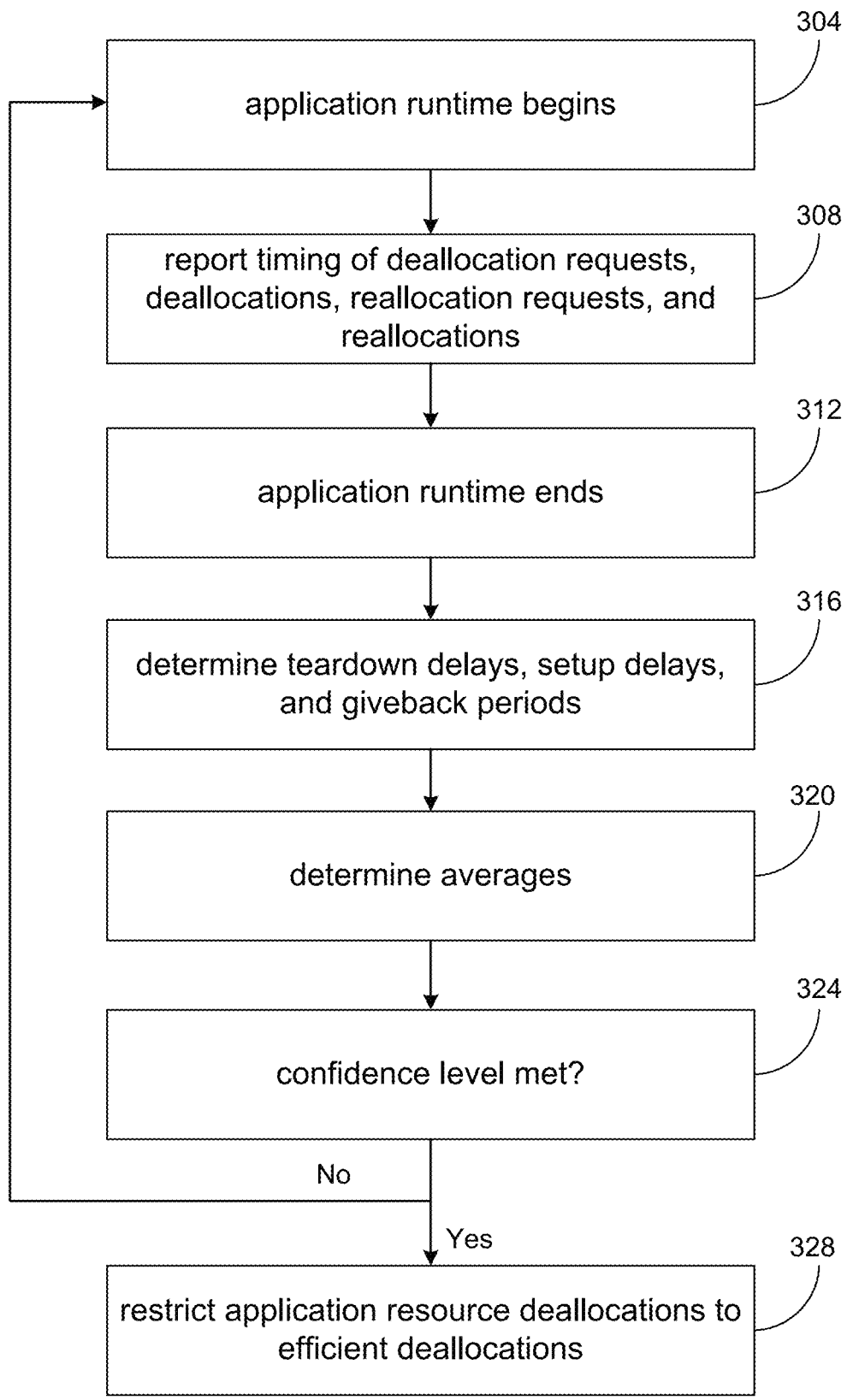
FIG. 3 is a flow chart illustrating aspects of the present disclosure.

FIG. 3 is a flowchart illustrating aspects of the present disclosure.

At 304, application runtime begins. This may coincide with an initial allocation of resources. Referencing FIG. 2, this may be, for example, at td1.

At 308, the timing of deallocation requests, corresponding deallocations, reallocation requests, and corresponding reallocations is reported. The reported timing may be for one or more types of resources. In an aspect, all allocations and deallocations are reported to application historical performance system 132 and application historical performance system 132 determines corresponding deallocations and reallocations.

At 312, the application runtime ends. While 308 is shown preceding 312, 308 may also occur after 312.

At 316, teardown delays, setup delays, and giveback periods are determined for the application runtime. In an aspect, application historical performance system 132 determines the teardown delays, setup delays, and giveback periods for the application runtime.

At 320, average teardown delay, setup delay, and giveback period may be determined for the application runtime. The average teardown delay, setup delay, and giveback period may be determined collectively for all resources or types of resources reported, or one or more resources or types or resources.

At 324, it may be determined whether a confidence level has been met to make predications. A confidence level requirement may be set by cloud service provider administrators. A single application runtime may be sufficient. In an aspect, a confidence level may be based on how many teardown delays, setup delays, and giveback periods are reported from a single runtime or across multiple runtimes. In another aspect, a confidence level may be based on the number of application runtimes measured. In yet another aspect, a confidence level may be based on a combination of the number of teardown delays, setup delays, and giveback periods reported, as well as the number of application runtimes measured. For example, a discrete number of application runtimes, teardown delays, setup delays, and giveback periods, or a subset thereof (for example, just application runtimes and teardown delays, or just teardown delays and giveback periods) may be required. If this confidence level has not been met, another application runtime will be needed (returning to 304).

At 328, a restriction is put in place limiting deallocations during runtimes of that application that are efficient. A deallocation request may be rejected, for example, where the determined average giveback period is less than the determined average delay, which is the sum of the determined average teardown delay and average setup delay. In an aspect, efficiency may set by cloud service provider administrators. In an aspect, resource deallocation controller 104 may receive a deallocation request from resource virtual controller 108. Application historical performance system 132 may provide the application historical performance, including, for example, average giveback period, average teardown delay, average setup delay, and average delay total, to resource deallocation controller 104 in order for resource deallocation controller 104 to decide whether to deallocate the resource.

Figure 4:
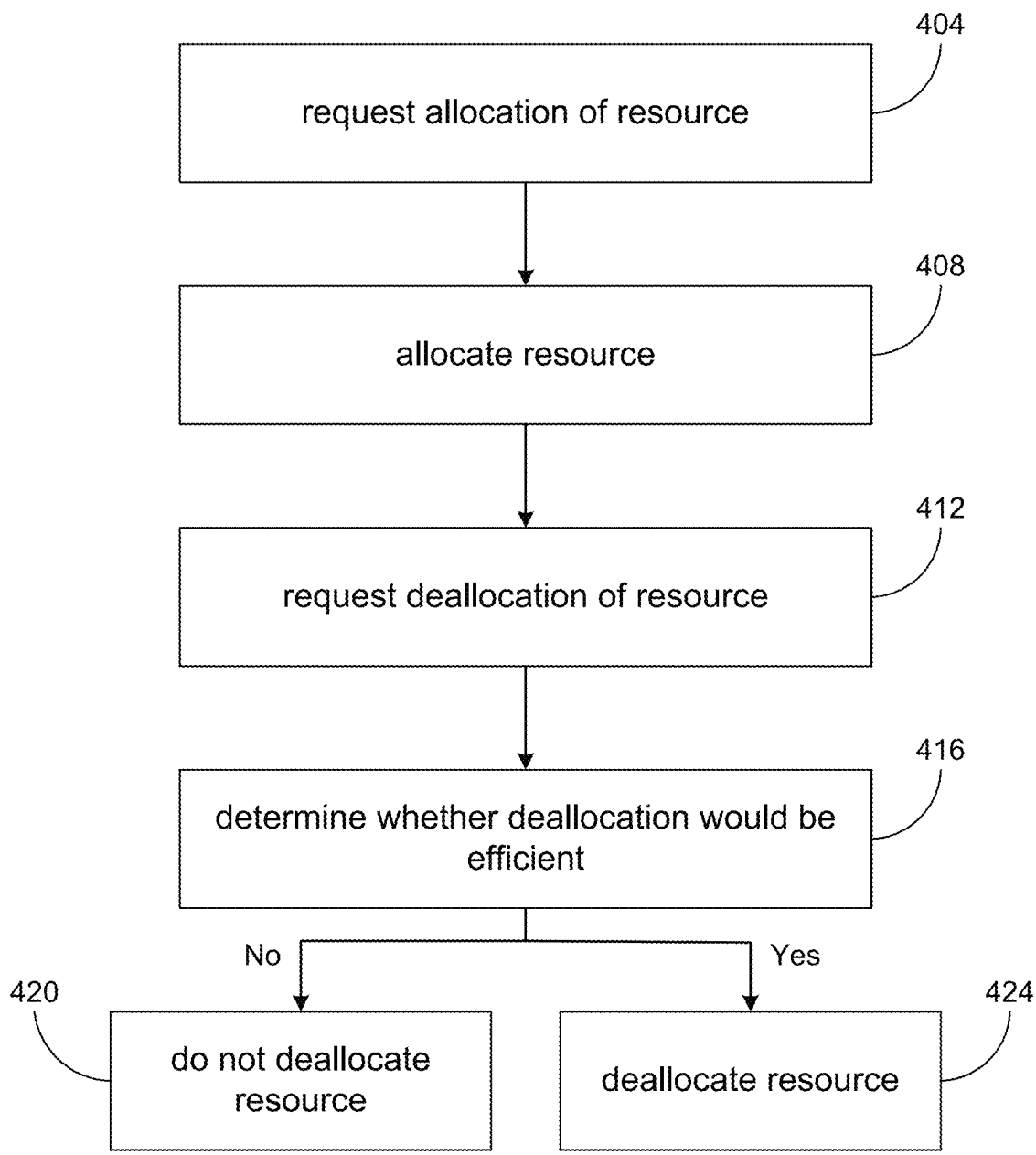
FIG. 4 is a flow chart illustrating aspects of the present disclosure.

FIG. 4 is a flowchart illustrating aspects of the present disclosure.

At 404, a resource is requested for an allocation. For example, referencing FIG. 2, a resource is requested at, for example, td3.

At 408, the requested resource is allocated. For example, referencing FIG. 2, a resource is allocated at ta3.

At 412, a request for deallocation of the resource (or a resource of that type) is made. For example, referencing FIG. 2, a deallocation request is made at td4.

At 416, it is determined whether deallocation would be efficient. For example, if the average application historical giveback period for the resource is greater than the average historical sum of deallocation delay and allocation delay, the resource may be deallocated. In an aspect, application historical performance may continue to be updated based on, for example, deallocations, reallocations, allocation requests, deallocation requests, giveback periods, setup delays, and teardown delays during the application's runtime. Application historical performance system 132 may continue to provide application historical performance information to resource deallocation controller 104 during the application runtime and while application historical performance system 132 is updating it based on what it receives during the application's runtime.

At 420, the resource is not deallocated. Resource deallocation controller 104 determines that deallocation of the resource would not be efficient and leaves the resource allocated to the application.

At 424, the resource is deallocated. Resource deallocation controller 104 determines that deallocation of the resource would be efficient and deallocates the resource from the application. Deallocation may include, for example, resource deallocation controller 104 sending a command to virtual resource controller 108 to deallocate a resource.

Figure 5:
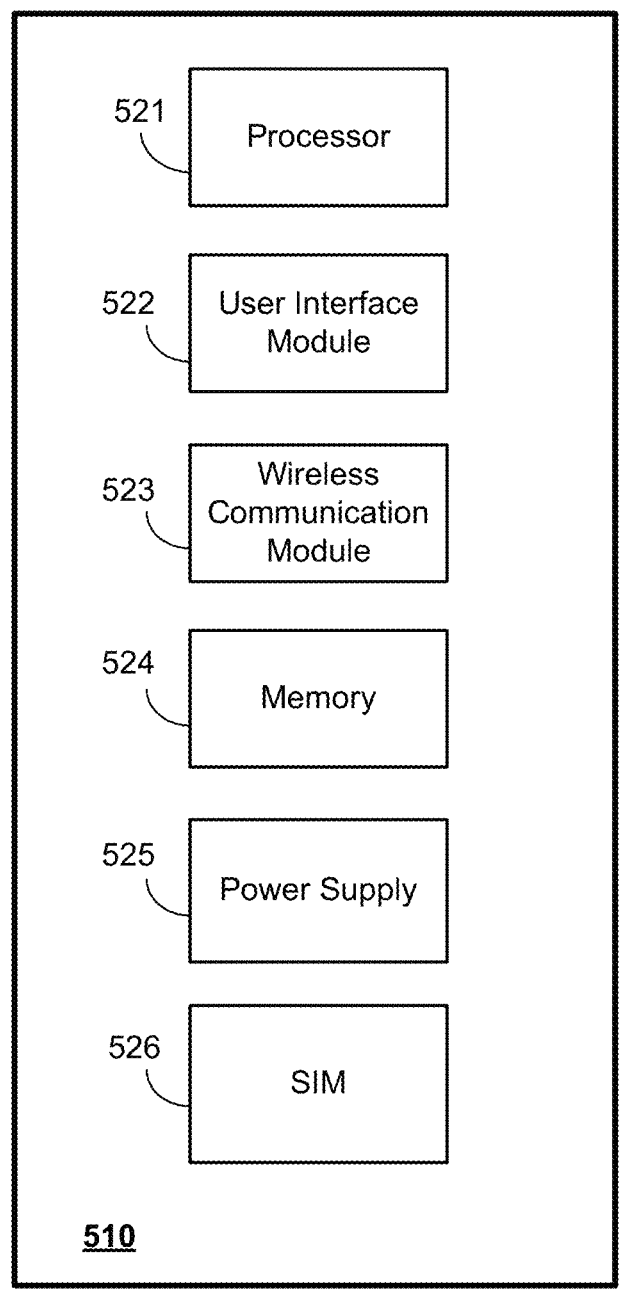
FIG. 5 is a block diagram of an example of a mobile device which may be utilized to facilitate efficient un-allocation of cloud resources.

FIG. 5 illustrates an example wireless device 510 that may be used in connection with an example of efficient un-allocation of cloud resources. References will also be made to other figures of the present disclosure as appropriate. It will be appreciated that the components and modules of wireless device 510 illustrated in FIG. 5 are illustrative, and that any number and type of components and/or modules may be present in wireless device 510. In addition, the functions performed by any or all of the components and modules illustrated in FIG. 5 may be performed by any number of physical components. Thus, it is possible that in some examples the functionality of more than one component and/or module illustrated in FIG. 5 may be performed by any number or types of hardware or hardware and software.

Processor 521 may comprise any appropriate circuitry that performs operations on behalf of wireless device 510. Such circuitry may include hardware and other components that enable processor 521 to perform any of the functions and methods described herein. Such circuitry and other components may also enable processor 521 to communicate and/or interact with other devices and components, for example any other component of device of wireless device 510, in such a manner as to enable processor 521 and such other devices and/or components to perform any of the disclosed functions and methods. In one example, processor 521 executes software (i.e., computer readable instructions stored in a computer readable medium) that may include functionality related to efficient un-allocation of cloud resources, for example. User interface module 522 may be any type or combination of hardware and software that enables a user to operate and interact with wireless device 510, and, in one example, to interact with a system enabling the user to place, request, and/or receive calls, text communications of any type, voicemail, voicemail notifications, voicemail content and/or data, and/or a system. For example, user interface module 522 may include a display, physical and/or "soft" keys, voice recognition software, a microphone, a touch screen, a speaker, and the like. A display of user interface module 522 may display, for example, application graphical user interfaces (GUIs), text, images, video, telephony functions such as Caller ID data, setup functions, menus, music, metadata, messages, wallpaper, graphics, Internet content, device status, preference settings, map and location data, routes and other directions, points of interest (POI), and the like. User interface module 522 may provide information visually (via, for example, a display), audibly (via, for example, a speaker), mechanically (via, for example, a vibrating mechanism such as a vibration motor), including haptically (or haptic feedback), or a combination thereof.

Wireless communication module 523 may be any type of transceiver including any combination of hardware and software that enables wireless device 510 to communicate with wireless network equipment. Memory 524 enables wireless device 510 to store information, such as APNs, MNCs, MCCs, text communications content and associated data, multimedia content, software to efficiently process radio resource requests and service requests, and radio resource request processing preferences and configurations. Memory 524 may take any form, such as internal random access memory (RAM), an SD card, a microSD card and the like. Power supply 525 may be a battery or other type of power input (e.g., a charging cable that is connected to an electrical outlet, etc.) that is capable of powering wireless device 510. SIM 1026 may be any type of Subscriber Identity Module and may be configured on a removable or non-removable SIM card that allows wireless device 510 to store data on SIM 526.

Figure 6:
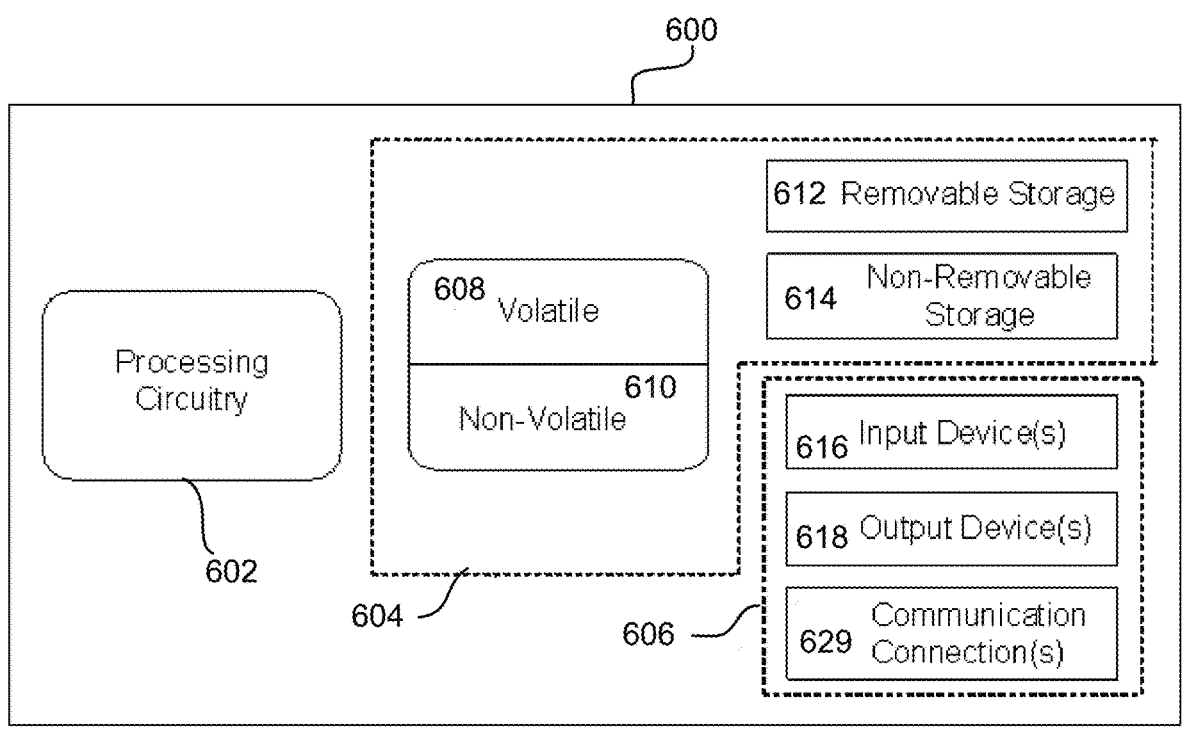
FIG. 6 is a block diagram of an example of a processor in which one or more disclosed examples may be implemented for efficient un-allocation of cloud resources.

FIG. 6 is a block diagram of an example apparatus 600 which may be employed in any of the examples described herein, including as one or more components of system 100, system 150, and/or any related equipment and/or as one or more components of any third party system or subsystem that may implement any portion of the subject matter described herein. Apparatus 600 may be a processor. It is emphasized that the block diagram depicted in FIG. 6 is exemplary and not intended to imply a specific implementation. Thus, the apparatus 600 may be implemented in a single processor or multiple processors. Multiple processors may be distributed or centrally located. Multiple processors can communicate wirelessly, via hard wire, or a combination thereof. Apparatus 600 may include circuitry and other components that enable apparatus 600 to perform any of the functions and methods described herein. Such circuitry and other components may also enable apparatus 600 to communicate and/or interact with other devices and components, for example any other component of any device disclosed herein or any other device, in such a manner as to enable apparatus 600 and such other devices and/or components to perform any of the disclosed functions and methods.

As depicted in FIG. 6, the apparatus 600 may comprise a processing portion 602, a memory portion 604, and an input/output portion 606. The processing portion 602, memory portion 604, and input/output portion 606 are coupled together (coupling not shown in FIG. 6) to allow communications between these portions. The input/output portion 606 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The apparatus 600 may be implemented as a client processor and/or a server processor. In a basic configuration, the apparatus 600 may include at least one processing portion 602 and memory portion 604. The memory portion 604 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for system 100, text and data communications, calls, voicemail, multimedia content, visual voicemail applications, etc. Depending upon the exact configuration and type of processor, the memory portion 604 can be volatile (such as RAM) 608, non-volatile (such as ROM, flash memory, etc.) 610, or a combination thereof. The apparatus 600 can have additional features/functionality. For example, the apparatus 600 may include additional storage (removable storage 612 and/or non-removable storage 614) including, but not limited to, magnetic or optical disks, tape, flash, smart cards or a combination thereof. Computer storage media, such as memory and storage elements 604, 608, 610, 612, and 614, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the apparatus 600. Any such computer storage media may be part of the apparatus 600. Any computer-readable storage medium described herein, including memory, is not to be construed as a signal, transient signal, or propagating signal. Memory, as well as any computer-readable storage medium described herein, is to be construed as an article of manufacture.

The apparatus 600 may also contain the communications connection(s) 620 that allow the apparatus 600 to communicate with other devices, for example through a radio access network (RAN). Communications connection(s) 620 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The apparatus 600 also can have input device(s) 616 such as keyboard, keypad, mouse, pen, voice input device, touch input device, etc. Output device(s) 618 such as a display, speakers, printer, etc., also can be included.

A RAN as described herein may comprise any telephony radio network, or any other type of communications network, wireline or wireless, or any combination thereof. The following description sets forth some exemplary telephony radio networks and non-limiting operating environments. The below-described operating environments should be considered non-exhaustive, however, and thus the below-described network architectures merely show how efficient un-allocation of cloud resources may be implemented with stationary and non-stationary network structures and architectures. It can be appreciated, however, that efficient un-allocation of cloud resources as described herein may be incorporated with existing and/or future alternative architectures for communication networks as well.

In the following, depending on context, the term "mobile subscriber" sometimes refers to the end user and sometimes to the actual portable device, such as a mobile device, used by an end user of the mobile cellular service.

Figure 7:
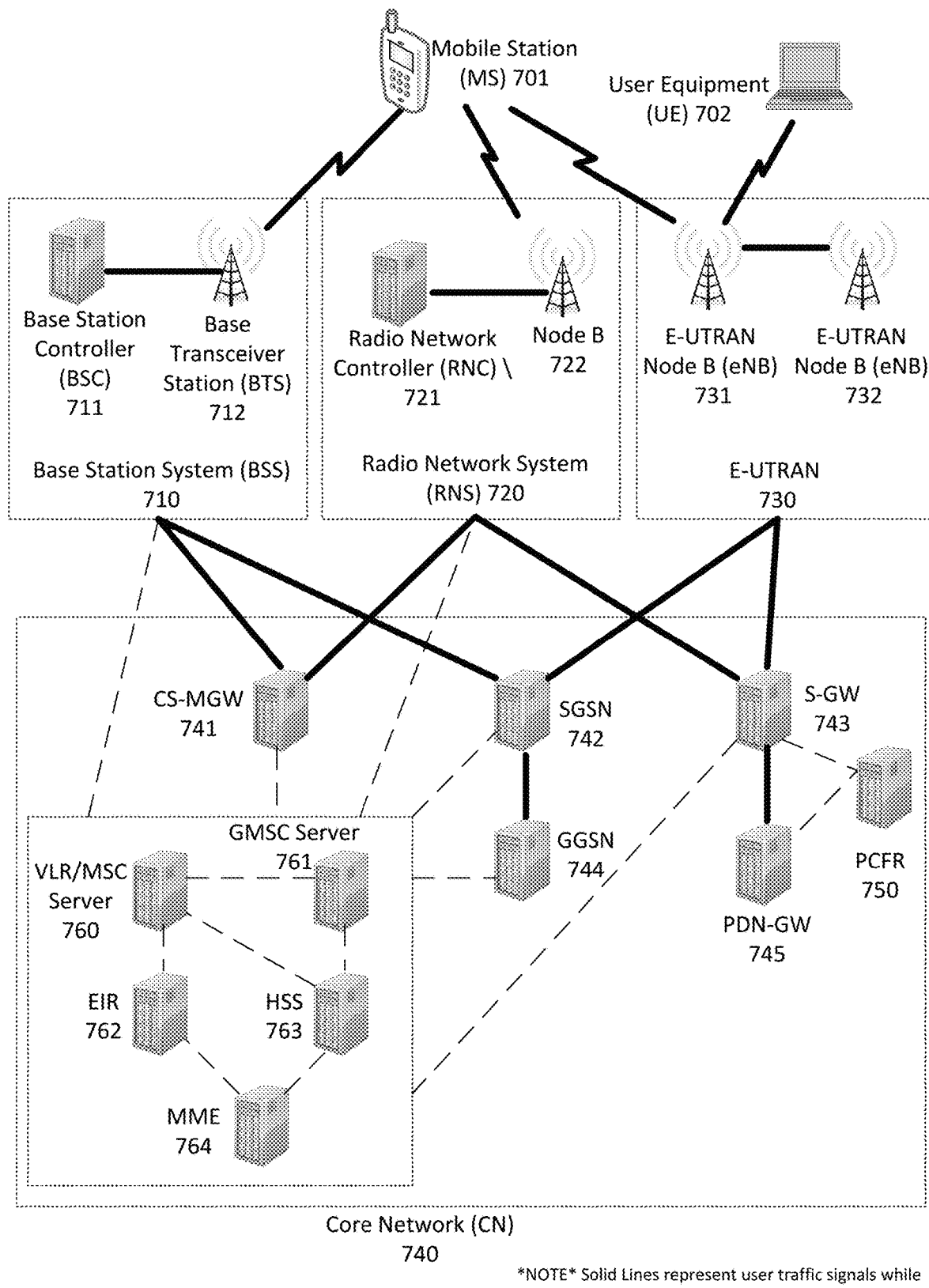
FIG. 7 illustrates a Public Land Mobile Network (PLMN) block diagram view of an exemplary architecture in which one or more disclosed examples may be implemented for efficient un-allocation of cloud resources.

FIG. 7 illustrates a public land mobile network (PLMN) block diagram view of an exemplary architecture in which efficient un-allocation of cloud resources may be incorporated. Mobile Station (MS) 701 is the physical equipment used by the PLMN subscriber. In one illustrative example, communications device 40 may serve as Mobile Station 701.

Mobile Station 701 may be one of, but not limited to, a cellular telephone, a cellular telephone in combination with another electronic device or any other wireless mobile communication device.

Mobile Station 701 may communicate wirelessly with Base Station System (BSS) 710. BSS 710 contains a Base Station Controller (BSC) 711 and a Base Transceiver Station (BTS) 712. BSS 710 may include a single BSC 711/BTS 712 pair (Base Station) or a system of BSC/BTS pairs which are part of a larger network. BSS 710 is responsible for communicating with Mobile Station 701 and may support one or more cells. BSS 710 is responsible for handling cellular traffic and signaling between Mobile Station 701 and Core Network 740. Typically, BSS 710 performs functions that include, but are not limited to, digital conversion of speech channels, allocation of channels to mobile devices, paging, and transmission/reception of cellular signals.

Additionally, Mobile Station 701 may communicate wirelessly with Radio Network System (RNS) 720. RNS 720 contains a Radio Network Controller (RNC) 721 and one or more Node B(s) 722. RNS 720 may support one or more cells. RNS 720 may also include one or more RNC 721/Node B 722 pairs or alternatively a single RNC 721 may manage multiple Node Bs 722. RNS 720 is responsible for communicating with Mobile Station 701 in its geographically defined area. RNC 721 is responsible for controlling the Node B(s) 722 that are connected to it and is a control element in a UMTS radio access network. RNC 721 performs functions such as, but not limited to, load control, packet scheduling, handover control, security functions, as well as controlling Mobile Station 701's access to the Core Network (CN) 740.

The evolved UMTS Terrestrial Radio Access Network (E-UTRAN) 730 is a radio access network that provides wireless data communications for Mobile Station 701 and User Equipment 702. E-UTRAN 730 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 730 may include of series of logical network components such as E-UTRAN Node B (eNB) 731 and E-UTRAN Node B (eNB) 732. E-UTRAN 730 may contain one or more eNBs. User Equipment 702 may be any user device capable of connecting to E-UTRAN 730 including, but not limited to, a personal computer, laptop, mobile device, wireless router, or other device capable of wireless connectivity to E-UTRAN 730. The improved performance of the E-UTRAN 730 relative to a typical UMTS network allows for increased bandwidth, spectral efficiency, and functionality including, but not limited to, voice, high-speed applications, large data transfer and IPTV, while still allowing for full mobility.

An exemplary mobile data and communication service that may be implemented in the PLMN architecture described in FIG. 7 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 701 may communicate with any or all of BSS 710, RNS 720, or E-UTRAN 730. In an illustrative system, each of BSS 710, RNS 720, and E-UTRAN 730 may provide Mobile Station 701 with access to Core Network 740. The Core Network 740 may include of a series of devices that route data and communications between end users. Core Network 740 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 741 is part of Core Network 740, and interacts with Visitor Location Register (VLR) and Mobile-Services Switching Center (MSC) Server 760 and Gateway MSC Server 761 in order to facilitate Core Network 740 resource control in the CS domain. Functions of CS-MGW 741 include, but are not limited to, media conversion, bearer control, payload processing and other mobile network processing such as handover or anchoring. CS-MGW 740 may receive connections to Mobile Station 701 through BSS 710, RNS 720 or both.

Serving GPRS Support Node (SGSN) 742 stores subscriber data regarding Mobile Station 701 in order to facilitate network functionality. SGSN 742 may store subscription information such as, but not limited to, the International Mobile Subscriber Identity (IMSI), temporary identities, or Packet Data Protocol (PDP) addresses. SGSN 742 may also store location information such as, but not limited to, the Gateway GPRS Support Node (GGSN) 744 address for each GGSN where an active PDP exists. GGSN 744 may implement a location register function to store subscriber data it receives from SGSN 742 such as subscription or location information.

Serving Gateway (S-GW) 743 is an interface which provides connectivity between E-UTRAN 730 and Core Network 740. Functions of S-GW 743 include, but are not limited to, packet routing, packet forwarding, transport level packet processing, event reporting to Policy and Charging Rules Function (PCRF) 750, and mobility anchoring for inter-network mobility. PCRF 750 uses information gathered from S-GW 743, as well as other sources, to make applicable policy and charging decisions related to data flows, network resources and other network administration functions. Packet Data Network Gateway (PDN-GW) 745 may provide user-to-services connectivity functionality including, but not limited to, network-wide mobility anchoring, bearer session anchoring and control, and IP address allocation for PS domain connections.

Home Subscriber Server (HSS) 763 is a database for user information, and stores subscription data regarding Mobile Station 701 or User Equipment 702 for handling calls or data sessions. Networks may contain one HSS 763 or more if additional resources are required. Exemplary data stored by HSS 763 include, but is not limited to, user identification, numbering and addressing information, security information, or location information. HSS 763 may also provide call or session establishment procedures in both the PS and CS domains.

The VLR/MSC Server 760 provides user location functionality. When Mobile Station 701 enters a new network location, it begins a registration procedure. A MSC Server for that location transfers the location information to the VLR for the area. A VLR and MSC Server may be located in the same computing environment, as is shown by VLR/MSC Server 760, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 701 registration or procedures for handover of Mobile Station 701 to a different section of the Core Network 740. GMSC Server 761 may serve as a connection to alternate GMSC Servers for other mobile stations in larger networks.

Equipment Identity Register (EIR) 762 is a logical element which may store the International Mobile Equipment Identities (IMEI) for Mobile Station 701. In a typical example, user equipment may be classified as either "white listed" or "black listed" depending on its status in the network. In one example, if Mobile Station 701 is stolen and put to use by an unauthorized user, it may be registered as "black listed" in EIR 762, preventing its use on the network. Mobility Management Entity (MME) 764 is a control node which may track Mobile Station 701 or User Equipment 702 if the devices are idle. Additional functionality may include the ability of MME 764 to contact an idle Mobile Station 701 or User Equipment 702 if retransmission of a previous session is required.

Figure 8:
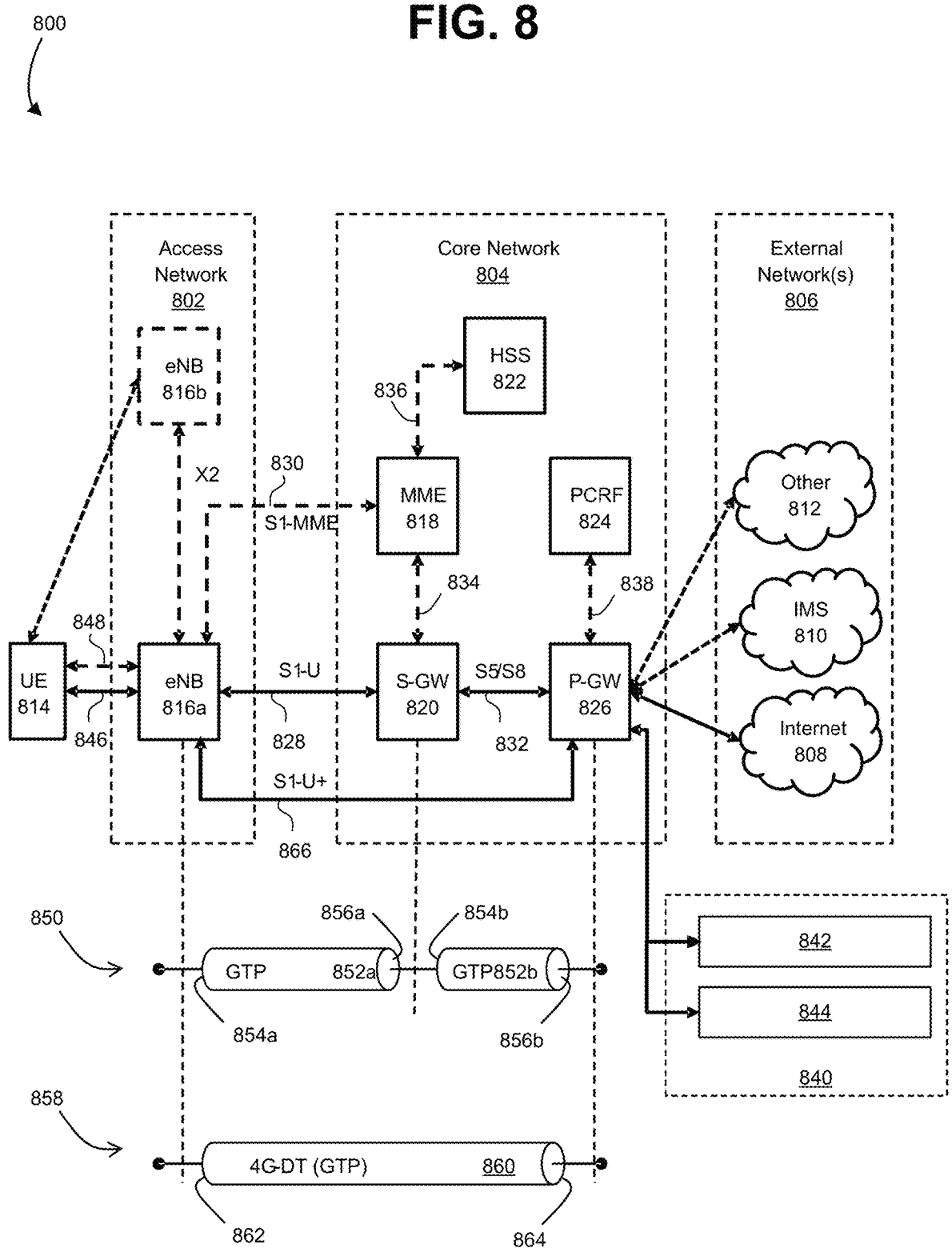
FIG. 8 is an illustrative network architecture in which one or more disclosed examples may be implemented for efficient un-allocation of cloud resources.

FIG. 8 illustrates a functional block diagram depicting one example of an LTE-EPS network architecture 800 related to the current disclosure. In particular, the network architecture 800 disclosed herein is referred to as a modified LTE-EPS architecture 800 to distinguish it from a traditional LTE-EPS architecture.

An example modified LTE-EPS architecture 800 is based at least in part on standards developed by the 3rd Generation Partnership Project (3GPP), with information available at www.3gpp.org. In one embodiment, the LTE-EPS network architecture 800 includes an access network 802, a core network 804, e.g., an EPC or Common BackBone (CBB) and one or more external networks 806, sometimes referred to as PDN or peer entities. Different external networks 806 can be distinguished from each other by a respective network identifier, e.g., a label according to DNS naming conventions describing an access point to the PDN. Such labels can be referred to as Access Point Names (APN). External networks 806 can include one or more trusted and non-trusted external networks such as an internet protocol (IP) network 808, an IP multimedia subsystem (IMS) network 810, and other networks 812, such as a service network, a corporate network, or the like.

Access network 802 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 802 can include one or more communication devices, commonly referred to as UE 814, and one or more wireless access nodes, or base stations 816*a*, 816*b*. During network operations, at least one base station 816 communicates directly with UE 814. Base station 816 can be an evolved Node B (e-NodeB), with which UE 814 communicates over the air and wirelessly. UEs 814 can include, without limitation, wireless devices, e.g., satellite communication systems, portable digital assistants (PDAs), laptop computers, tablet devices and other mobile devices (e.g., cellular telephones, smart appliances, and so on). UEs 814 can connect to eNBs 816 when UE 814 is within range according to a corresponding wireless communication technology.

UE 814 generally runs one or more applications that engage in a transfer of packets between UE 814 and one or more external networks 806. Such packet transfers can include one of downlink packet transfers from external network 806 to UE 814, uplink packet transfers from UE 814 to external network 806 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 804, e.g., according to parameters, such as the QoS.

Core network 804 uses a concept of bearers, e.g., EPS bearers, to route packets, e.g., IP traffic, between a particular gateway in core network 804 and UE 814. A bearer refers generally to an IP packet flow with a defined QoS between the particular gateway and UE 814. Access network 802, e.g., E UTRAN, and core network 804 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 804 includes various network entities, such as MME 818, SGW 820, Home Subscriber Server (HSS) 822, Policy and Charging Rules Function (PCRF) 824 and PGW 826. In one embodiment, MME 818 comprises a control node performing a control signaling between various equipment and devices in access network 802 and core network 804. The protocols running between UE 814 and core network 804 are generally known as Non-Access Stratum (NAS) protocols.

For illustration purposes only, the terms MME 818, SGW 820, HSS 822 and PGW 826, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 820 routes and forwards all user data packets. SGW 820 also acts as a mobility anchor for user plane operation during handovers between base stations, e.g., during a handover from first eNB 816*a* to second eNB 816*b* as may be the result of UE 814 moving from one area of coverage, e.g., cell, to another. SGW 820 can also terminate a downlink data path, e.g., from external network 806 to UE 814 in an idle state, and trigger a paging operation when downlink data arrives for UE 814. SGW 820 can also be configured to manage and store a context for UE 814, e.g., including one or more of parameters of the IP bearer service and network internal routing information. In addition, SGW 820 can perform administrative functions, e.g., in a visited network, such as collecting information for charging (e.g., the volume of data sent to or received from the user), and/or replicate user traffic, e.g., to support a lawful interception. SGW 820 also serves as the mobility anchor for interworking with other 3GPP technologies such as universal mobile telecommunication system (UMTS).

At any given time, UE 814 is generally in one of three different states: detached, idle, or active. The detached state is typically a transitory state in which UE 814 is powered on but is engaged in a process of searching and registering with network 802. In the active state, UE 814 is registered with access network 802 and has established a wireless connection, e.g., radio resource control (RRC) connection, with eNB 816. Whether UE 814 is in an active state can depend on the state of a packet data session, and whether there is an active packet data session. In the idle state, UE 814 is generally in a power conservation state in which UE 814 typically does not communicate packets. When UE 814 is idle, SGW 820 can terminate a downlink data path, e.g., from one peer entity 806, and triggers paging of UE 814 when data arrives for UE 814. If UE 814 responds to the page, SGW 820 can forward the IP packet to eNB 816a.

HSS 822 can manage subscription-related information for a user of UE 814. For example, HSS 822 can store information such as authorization of the user, security requirements for the user, quality of service (QoS) requirements for the user, etc. HSS 822 can also hold information about external networks 806 to which the user can connect, e.g., in the form of an APN of external networks 806. For example, MME 818 can communicate with HSS 822 to determine if UE 814 is authorized to establish a call, e.g., a voice over IP (VoIP) call before the call is established.

PCRF 824 can perform QoS management functions and policy control. PCRF 824 is responsible for policy control decision-making, as well as for controlling the flow-based charging functionalities in a policy control enforcement function (PCEF), which resides in PGW 826. PCRF 824 provides the QoS authorization, e.g., QoS class identifier and bit rates that decide how a certain data flow will be treated in the PCEF and ensures that this is in accordance with the user's subscription profile.

PGW 826 can provide connectivity between the UE 814 and one or more of the external networks 806. In illustrative network architecture 800, PGW 826 can be responsible for IP address allocation for UE 814, as well as one or more of QoS enforcement and flow-based charging, e.g., according to rules from the PCRF 824. PGW 826 is also typically responsible for filtering downlink user IP packets into the different QoS-based bearers. In at least some embodiments, such filtering can be performed based on traffic flow templates. PGW 826 can also perform QoS enforcement, e.g., for guaranteed bit rate bearers. PGW 826 also serves as a mobility anchor for interworking with non-3GPP technologies such as CDMA2000.

Within access network 802 and core network 804 there may be various bearer paths/interfaces, e.g., represented by solid lines 828 and 830. Some of the bearer paths can be referred to by a specific label. For example, solid line 828 can be considered an S1-U bearer and solid line 832 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 804 can include various signaling bearer paths/interfaces, e.g., control plane paths/interfaces represented by dashed lines 830, 834, 836, and 838. Some of the signaling bearer paths may be referred to by a specific label. For example, dashed line 830 can be considered as an S1-MME signaling bearer, dashed line 834 can be considered as an S11 signaling bearer and dashed line 836 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 866. In the illustrative example, the S1-U+ user plane interface extends between the eNB 816a and PGW 826. Notably, S1-U+ path/interface does not include SGW 820, a node that is otherwise instrumental in configuring and/or managing packet forwarding between eNB 816a and one or more external networks 806 by way of PGW 826. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 820, 826 due to excessive handover events.

In some embodiments, PGW 826 is coupled to storage device 840, shown in phantom. Storage device 840 can be integral to one of the network nodes, such as PGW 826, for example, in the form of internal memory and/or disk drive. It is understood that storage device 840 can include registers suitable for storing address values. Alternatively or in addition, storage device 840 can be separate from PGW 826, for example, as an external hard drive, a flash drive, and/or network storage.

Storage device 840 selectively stores one or more values relevant to the forwarding of packet data. For example, storage device 840 can store identities and/or addresses of network entities, such as any of network nodes 818, 820, 822, 824, and 826, eNBs 816 and/or UE 814. In the illustrative example, storage device 840 includes a first storage location 842 and a second storage location 844. First storage location 842 can be dedicated to storing a Currently Used Downlink address value 842. Likewise, second storage location 844 can be dedicated to storing a Default Downlink Forwarding address value 844. PGW 826 can read and/or write values into either of storage locations 842, 844, for example, managing Currently Used Downlink Forwarding address value 842 and Default Downlink Forwarding address value 844 as disclosed herein.

In some embodiments, the Default Downlink Forwarding address for each EPS bearer is the SGW S5-U address for each EPS Bearer. The Currently Used Downlink Forwarding address" for each EPS bearer in PGW 826 can be set every time when PGW 826 receives an uplink packet, e.g., a GTP-U uplink packet, with a new source address for a corresponding EPS bearer. When UE 814 is in an idle state, the "Current Used Downlink Forwarding address" field for each EPS bearer of UE 814 can be set to a "null" or other suitable value.

In some embodiments, the Default Downlink Forwarding address is only updated when PGW 826 receives a new SGW S5-U address in a predetermined message or messages. For example, the Default Downlink Forwarding address is only updated when PGW 826 receives one of a Create Session Request, Modify Bearer Request and Create Bearer Response messages from SGW 820.

As values 842, 844 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 802 and core network 804 are illustrated in a simplified block diagram in FIG. 8. In other words, either or both of access network 802 and the core network 804 can include additional network elements that are not shown, such as various routers, switches and controllers. In addition, although FIG. 8 illustrates only a single one of each of the various network elements, it should be noted that access network 802 and core network 804 can include any number of the various network elements. For example, core network 804 can include a pool (i.e., more than one) of MMEs 818, SGWs 820 or PGWs 826.

In the illustrative example, data traversing a network path between UE 814, eNB 816a, SGW 820, PGW 826 and external network 806 may be considered to constitute data transferred according to an end-to-end IP service. However, for the present disclosure, to properly perform establishment management in LTE-EPS network architecture 800, the core network, data bearer portion of the end-to-end IP service is analyzed.

An establishment may be defined herein as a connection set up request between any two elements within LTE-EPS network architecture 800. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 814 and eNB 816a, a second portion (e.g., an S1 data bearer 828) between eNB 816a and SGW 820, and a third portion (e.g., an S5/S8 bearer 832) between SGW 820 and PGW 826. Various signaling bearer portions are also illustrated in FIG. 8. For example, a first signaling portion (e.g., a signaling radio bearer 848) between UE 814 and eNB 816a, and a second signaling portion (e.g., S1 signaling bearer 830) between eNB 816a and MME 818.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 800, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 850 includes a first tunnel 852a between two tunnel endpoints 854a and 856a, and a second tunnel 852b between two tunnel endpoints 854b and 856b. In the illustrative example, first tunnel 852a is established between eNB 816a and SGW 820. Accordingly, first tunnel 852a includes a first tunnel endpoint 854a corresponding to an S1-U address of eNB 816a (referred to herein as the eNB S1-U address), and second tunnel endpoint 856a corresponding to an S1-U address of SGW 820 (referred to herein as the SGW S1-U address). Likewise, second tunnel 852b includes first tunnel endpoint 854b corresponding to an S5-U address of SGW 820 (referred to herein as the SGW S5-U address), and second tunnel endpoint 856b corresponding to an S5-U address of PGW 826 (referred to herein as the PGW S5-U address).

In at least some embodiments, first tunnel solution 850 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 858 includes a single or direct tunnel 860 between tunnel endpoints 862 and 864. In the illustrative example, direct tunnel 860 is established between eNB 816a and PGW 826, without subjecting packet transfers to processing related to SGW 820. Accordingly, direct tunnel 860 includes first tunnel endpoint 862 corresponding to the eNB S1-U address, and second tunnel endpoint 864 corresponding to the PGW S5-U address. Packet data received at either end can be encapsulated into a payload and directed to the corresponding address of the other end of the tunnel. Such direct tunneling avoids processing, e.g., by SGW 820 that would otherwise relay packets between the same two endpoints, e.g., according to a protocol, such as the GTP-U protocol.

In some scenarios, direct tunneling solution 858 can forward user plane data packets between eNB 816a and PGW 826, by way of SGW 820. That is, SGW 820 can serve a relay function, by relaying packets between two tunnel endpoints 816a, 826. In other scenarios, direct tunneling solution 858 can forward user data packets between eNB 816a and PGW 826, by way of the S1 U+ interface, thereby bypassing SGW 820.

Generally, UE 814 can have one or more bearers at any one time. The number and types of bearers can depend on applications, default requirements, and so on. It is understood that the techniques disclosed herein, including the configuration, management and use of various tunnel solutions 850, 858, can be applied to the bearers on an individual bases. That is, if user data packets of one bearer, say a bearer associated with a VoIP service of UE 814, then the forwarding of all packets of that bearer are handled in a similar manner. Continuing with this example, the same UE 814 can have another bearer associated with it through the same eNB 816a. This other bearer, for example, can be associated with a relatively low rate data session forwarding user data packets through core network 804 simultaneously with the first bearer. Likewise, the user data packets of the other bearer are also handled in a similar manner, without necessarily following a forwarding path or solution of the first bearer. Thus, one of the bearers may be forwarded through direct tunnel 858; whereas, another one of the bearers may be forwarded through a two-tunnel solution 850.

While example embodiments of efficient un-allocation of cloud resources have been described in connection with various computing devices/processors, the underlying concepts may be applied to any computing device, processor, or system capable of facilitating intelligent traffic routing. The various techniques described herein may be implemented in connection with hardware or software or, where appropriate, with a combination of both. Thus, the methods and apparatuses for efficient un-allocation of cloud resources, or certain aspects or portions thereof, may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an apparatus for intelligent traffic routing, on user equipment as described herein. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses associated with efficient un-allocation of cloud resources as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing intelligent traffic routing as described herein. When implemented on a general-purpose processor, the program code combines with the processor to provide a unique apparatus that operates to invoke the functionality of intelligent traffic routing as described herein.

While systems and methods for efficient un-allocation of cloud resources have been described in connection with the various embodiments of the various figures, it is to be understood that other similar embodiments may be used or modifications and additions may be made to the described embodiments of systems and methods for efficient un-allocation of cloud resources without deviating therefrom. For example, one skilled in the art will recognize that systems and methods for efficient un-allocation of cloud resources as described in the instant application may apply to any environment, whether wired or wireless, and may be applied to any number of such devices connected via a communications network and interacting across the network. Therefore, systems and methods for efficient un-allocation of cloud resources as described herein should not be limited to any single embodiment, but rather should be construed in breadth and scope in accordance with the appended claims.

What is claimed:

1. A computer-readable storage medium comprising executable instructions that cause a processor executing the instructions to effectuate operations comprising:
   receiving a request for an allocation of a first resource, wherein the first resource is of a first type of a plurality of types of resources;
   based on the request for the allocation of the first resource, allocating the first resource;
   receiving a request for deallocation of a second resource, wherein the second resource is of the first type of the plurality of types of resources; and
   based on the request for deallocation of the second resource, determining whether to deallocate the second resource based on an application historical performance for the first type of the plurality of types of resources, wherein the application historical performance is based on average deallocation delay, average allocation delay, reallocations, or allocation requests.

2. The computer-readable storage medium of claim 1, wherein the application historical performance is further based on average giveback periods.

3. The computer-readable storage medium of claim 1, wherein the application historical performance is further based on average deallocation delay.

4. The computer-readable storage medium of claim 1, wherein the application historical performance is further based on average allocation delay.

5. The computer-readable storage medium of claim 1, wherein the application historical performance is further based on deallocation requests.

6. The computer-readable storage medium of claim 1, wherein the application historical performance is further based on reallocations.

7. The computer-readable storage medium of claim 1, wherein the application historical performance is further based on allocation requests.

8. The computer-readable storage medium of claim 1, wherein the application historical performance is further based on teardown delays.

9. The computer-readable storage medium of claim 1, wherein the application historical performance is further based on setup delays.

10. The computer-readable storage medium of claim 1, wherein the determining whether to deallocate the second resource if further based on the application historical performance for the first type of the plurality of types of resources being greater than an average historical sum of a deallocation delay and an allocation delay.

11. A system, the system comprising:
    the one or more processors; and
    memory coupled with the one or more processors, the memory having instructions stored thereon executable instructions that cause the one or more processors to effectuate operations comprising:
      receiving a request for an allocation of a first resource, wherein the first resource is of a first type of a plurality of types of resources;
      based on the request for the allocation of the first resource, allocating the first resource;
      receiving a request for deallocation of a second resource, wherein the second resource is of the first type of the plurality of types of resources; and
      based on the request for deallocation of the second resource, determining whether to deallocate the second resource based on an application historical performance for the first type of the plurality of types of resources, wherein the application historical performance is based on setup delays or teardown delays.

12. The system of claim 11, wherein the application historical performance is further based on average giveback periods.

13. The system of claim 11, wherein the application historical performance is further based on average deallocation delay.

14. The system of claim 11, wherein the application historical performance is further based on average allocation delay.

15. The system of claim 11, wherein the system comprises a client device.

16. A method, the method comprising:
- receiving a request for an allocation of a first resource, wherein the first resource is of a first type of a plurality of types of resources;
- based on the request for the allocation of the first resource, allocating the first resource;
- receiving a request for deallocation of a second resource, wherein the second resource is of the first type of the plurality of types of resources; and
- based on the request for deallocation of the second resource, determining whether to deallocate the second resource based on an application historical performance for the first type of the plurality of types of resources, wherein the application historical performance is based on setup delays or teardown delays.

17. The method of claim 16, wherein the application historical performance is further based on average giveback periods.

18. The method of claim 16, wherein the application historical performance is further based on average deallocation delay.

19. The method of claim 16, wherein the determining whether to deallocate the second resource if further based on the application historical performance for the first type of the plurality of types of resources being greater than an average historical sum of a deallocation delay and an allocation delay.

* * * * *